Aug. 28, 1928.
G. A. MITCHELL
1,682,139
VIEW FINDER
Filed May 22, 1926
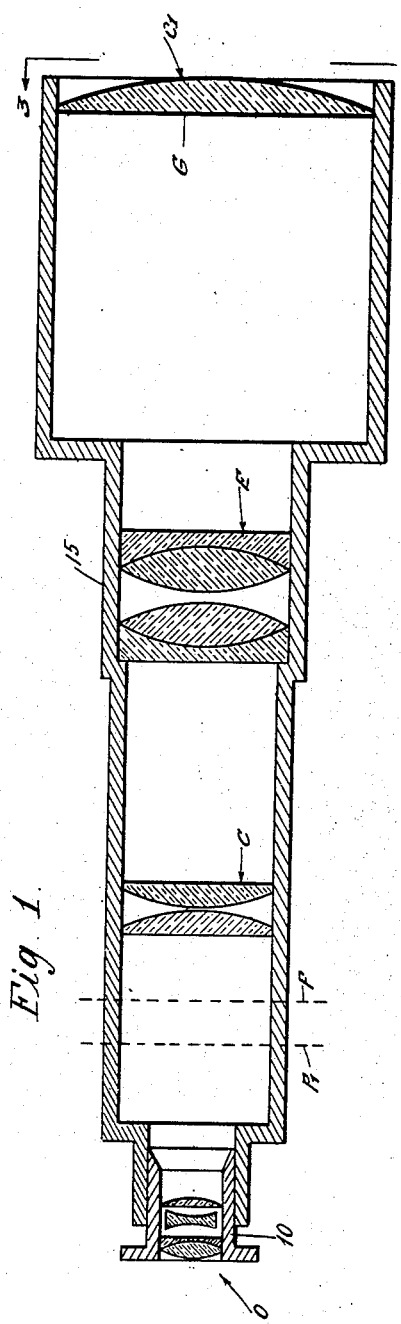
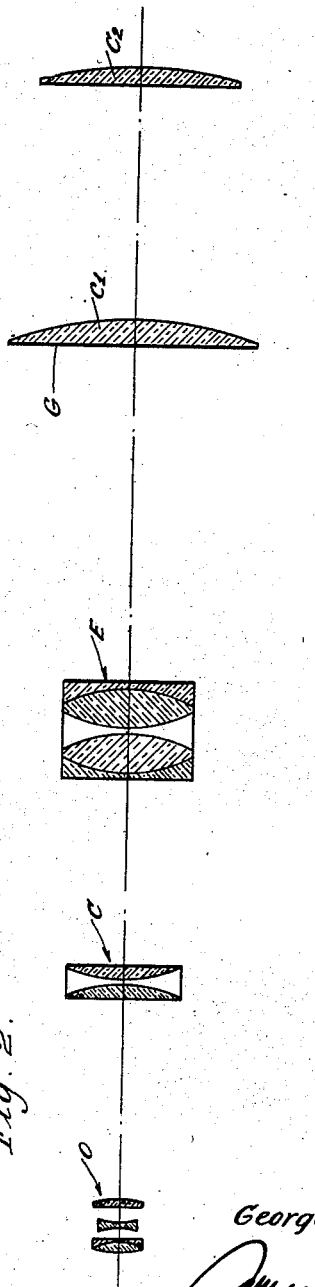
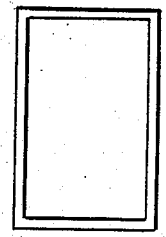
Inventor.
George A. Mitchell.
Attorney.

Patented Aug. 28, 1928.

1,682,139

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

VIEW FINDER.

Application filed May 22, 1926. Serial No. 110,865.

This invention has to do with finding instruments for cameras and the like. It has been particularly developed and designed for use in connection with motion picture cameras where the image on the film is small and, therefore, difficult to view directly for purposes if ascertaining the field of view; and although the invention is not necessarily limited to use in connection with any particular kind of camera, it will be explained in specific and illustrative form with motion picture cameras in mind.

As in focusing instruments for motion picture cameras, it is desirable that the finder for such a camera show the actual view sufficiently magnified to make it clear to the camera operator. It may be said that a general object of this invention is to provide a view finding instrument that will show an upright image with good illumination and distinct detail and large enough to be seen clearly without minute inspection; and to do this with a simple form of apparatus having preferably only one focusing adjustment to obtain a clear image. How the invention accomplishes this object, and the invention itself, will be best understood from the following detailed and particular description of one specific and illustrative form of the invention, reference for this purpose being had to the accompanying drawings, in which:

Fig. 1 is a longitudinal central section showing a preferred form of the finder;

Fig. 2 is a diagrammatic showing of a slightly modified form; and

Fig. 3 is an end view as indicated by line 3—3 on Fig. 1.

Although it is not intended that the specific details, as to exact dimensions of lenses and exact relative arrangements, shall be a limitation upon the invention, this description will set out the present preferred specific form in such detail as has been found satisfactory in an actual instrument. And with this understanding I may state that Fig. 1 of the drawings shows the lens sizes and relative spacings at the full dimensions of an actual instrument.

Objective O may be of any suitable kind. Its focal length is such that it may be adjusted in position to throw its image upon the focal plane indicated by the dotted line F, which focal plane is forward of collective lens C but at a point within its focal center. In the particular instance here given, the focal length of objective O is 40 mm., and that of collective C is 1¾ inches. For purposes of adjustment objective O may be mounted in any suitable manner. It is illustrated in the drawing as being simply mounted in a slide tube 10 in casing 15. Adjustment of objective O for focusing is the only adjustment in the whole instrument.

Eye lens E is located between focal plane F and collective $C^1$, the last mentioned lens being preferaby a plano-convex lens with a plane ground surface G, this surface acting in effect like a ground glass. Eye lens E may preferably be a pair of plano-convex lenses and its function is, generally speaking, to view the image formed by lens C and cast an image preferably enlarged upon ground surface G where that image may then be viewed directly.

The image cast by objective O on plane F is a real image and is inside the focal center of collective C. Being thus inside that focal center collective C acts as a simple magnifying lens or collective, causing convergence of the light rearwardly onto eye lens E and thereby not only magnifying the image at F, but also effectively collecting more light for lens E. Lens E may be likened to the eye viewing through collective C an enlarged virtual image of the small image that is thrown on focal plane F by objective O; and, viewing that virtual image, eye lens E then throws a real image onto ground surface G.

With a real image in focal plane F, and the characteristics of lenses C and E being determined, the relative distances of C, E and G may then be set and will need no adjustment to obtain a clear final image at G. In such a system it is then only necessary to adjust objective O along the optical axis so that its real image is thrown on focal plane F, that position of the real image being then indicated to the operator by the fact that the image at G is clear and sharp.

With the real image from objective O in plane F, the virtual image formed by collective C will be at a definite fixed plane, such as is designated F¹. That virtual image is fixed in position with regard to lenses C and E and is of a certain size relative to that of the real image in plane F. If it is desired that the final image at G be the same size as that at F¹, then the focal length of eye lens E is one-quarter the distance between F¹ and G and the eye lens is placed midway between F¹ and G. If it is desired that the image of G be still larger, then the distance F¹—G is greater than four times the focal length of E and E is placed further forward, as will be well understood.

In the specific instance here given, lens E has a focal length of about 1¾ inches and is placed with its optical center substantially 3¾ inches forward of G. The amount of desired magnification having been determined, collective C¹ is made of proper size to take just the field of view desired; and that collective with its ground surface G is also made of such shape that it properly frames the final image to show the exact field. Thus the collective may be rectangular, as shown in Fig. 3 and of dimensions say two and one-half times the dimensions of a picture frame on a motion picture film. In the particular instance here given the arrangement is such that surface G shows, magnified, the whole of the field that is thrown onto a motion picture film using a 40 mm. photographic objective. For longer length lenses, a mat is placed over surface G to cut down its area.

Collective C¹ acts not only as a ground glass to show a final real image, but also acts to collect the light from the image for the eye of the observer. The image actually viewed through collective C¹ is a slightly enlarged virtual image of the image on ground surface G. It is, of course, possible to place behind collective C¹ a further magnifying system. For instance in Fig. 2 another simple magnifying lens is shown at C².

The instrument I have described shows a very clear image with substantially even illumination over the entire field. The illumination is good, due to utilization of a large proportion of the light passing through the objective; and the definition over the whole of the magnified image is very clear.

I claim:

1. In an optical instrument of the character described, an objective lens adapted to throw a real image in a given focal plane, a collective lens spaced behind said plane and at a distance less than its focal length from said plane, an eye lens arranged behind the collective lens adapted to view said image through said collective lens and to throw another real image to another fixed focal plane, and a ground glass at said last mentioned focal plane.

2. In an optical instrument of the character described, an objective lens adapted to throw a real image in a given focal plane, a collective lens spaced behind said plane and at a distance less than its focal length from said plane, an eye lens arranged behind the collective lens adapted to view said image through said collective lens and to throw another real image to another fixed focal plane, and a plano-convex collective lens with a ground plane surface at said last mentioned focal plane.

3. In an optical instrument of the character described, an objective lens, a collective lens spaced wholly behind the objective with its optical center less than its focal length distant from the focal plane of the objective, an eye lens behind said collective at a fixed distance, and a ground glass behind the eye lens in the focal plane of the image cast by said eye lens.

4. In an optical instrument of the character described, an objective lens, a collective lens spaced wholly behind the objective with its optical center less than its focal length distant from the focal plane of the objective, an eye lens behind said collective at a fixed distance, and a plano-convex collective lens with a ground plane surface arranged behind the eye lens with its plane surface in the focal plane of said eye lens.

In witness that I claim the foregoing I have hereunto subscribed my name this 29 day of April, 1926.

GEORGE A. MITCHELL.